United States Patent [19]

Hsu et al.

[11] Patent Number: 5,173,550
[45] Date of Patent: Dec. 22, 1992

[54] SYNTHESIS OF RANDOM STYRENE-ISOPRENE RUBBERS

[75] Inventors: Wen-Liang Hsu, Copley; Adel F. Halasa, Bath, both of Ohio

[73] Assignee: The Goodyear Tire & Rubber Company, Akron, Ohio

[21] Appl. No.: 680,868

[22] Filed: Apr. 5, 1991

[51] Int. Cl.$^5$ .................. C08F 4/48; C08F 236/10
[52] U.S. Cl. .................. 526/180; 526/173; 526/179; 526/340
[58] Field of Search ............ 526/179, 180, 340, 173; 525/332.9

[56] References Cited

U.S. PATENT DOCUMENTS

| | | | |
|---|---|---|---|
| 4,022,959 | 5/1977 | Sommer et al. | 526/180 |
| 4,247,418 | 1/1981 | Halasa et al. | 252/431 N |
| 4,264,753 | 4/1981 | Halasa et al. | 526/180 |
| 4,553,578 | 11/1985 | Vitus et al. | 152/209 R |
| 4,616,065 | 10/1986 | Hargis et al. | 525/99 |
| 4,669,518 | 6/1987 | Hargis et al. | 152/209 R |
| 4,670,502 | 6/1987 | Hargis et al. | 524/505 |
| 4,696,986 | 9/1987 | Halasa et al. | 526/181 |
| 4,742,124 | 5/1988 | Tsutsumi et al. | 525/332.9 X |
| 4,843,120 | 6/1989 | Halasa et al. | 525/53 |
| 4,845,165 | 7/1989 | Halasa et al. | 526/78 |

FOREIGN PATENT DOCUMENTS 0098977 1/1984 European Pat. Off. ............ 526/175

*Primary Examiner*—Fred Teskin
*Attorney, Agent, or Firm*—Alvin T. Rockhill

[57] ABSTRACT

The subject invention relates to a process for synthesizing random styrene-isoprene copolymers having a medium vinyl microstructure. These random styrene-isoprene rubbers have physical properties which make them highly desirable for utilization in tire tread rubber compounds. The utilization of such random styrene-isoprene rubbers in tire tread rubber results in improved tread wear, rolling resistance and traction characteristics. This invention more specifically relates to a process for preparing a random styrene-isoprene rubber having a medium vinyl microstructure which comprises copolymerizing isoprene and styrene in the presence of (a) at least one organolithium compound and (b) at least one modifier slected from the group consisting of 1,2-dipiperidinoethane, dipiperidinomethane, and tripiperidinophosphine oxide.

16 Claims, No Drawings

SYNTHESIS OF RANDOM STYRENE-ISOPRENE RUBBERS

BACKGROUND OF THE INVENTION

Isoprene has a slower polymerization rate than styrene in homopolymerizations which are initiated utilizing organolithium compounds. However, isoprene exhibits a faster rate of polymerization than styrene in copolymerizations which are carried out in nonpolar solvents. As a consequence of this difference in polymerization rate, in batch copolymerizations of styrene and isoprene, the initial portion of the copolymer chain is mainly comprised of repeat units which are derived from isoprene. This is followed by a block of repeat units which are derived primarily from styrene due to exhaustion of the isoprene monomer. The styrene-isoprene rubber which is produced from such polymerizations is, of course, very blocky and also exhibits a very low vinyl content.

Polar modifiers are commonly used in the preparation of synthetic polydiene rubbers which are prepared utilizing lithium catalyst systems in order to increase their vinyl content. Ethers and tertiary amines which act as Lewis bases are commonly used as modifiers. For instance, U.S. Pat. No. 4,022,959 indicates that diethyl ether, di-n-propyl ether, diisopropyl ether, di-n-butyl ether, tetrahydrofuran, dioxane, ethylene glycol dimethyl ether, ethylene glycol diethyl ether, diethylene glycol dimethyl ether, diethylene glycol diethyl ether, triethylene glycol dimethyl ether, trimethylamine, triethylamine, N,N,N',N'-tetramethylethylenediamine, N-methyl morpholine, N-ethyl morpholine, and N-phenyl morpholine can be used as modifiers. The vinyl group content of polydienes prepared utilizing such Lewis bases as modifiers depends upon the type and amount of Lewis base employed as well as the polymerization temperature utilized. For example, if a higher polymerization temperature is employed, a polymer with a lower vinyl group content is obtained (see A. W. Langer: A. Chem. Soc. Div. Polymer Chem. Reprints: Vol. 7 (1), 132 [1966]).

The utilization of such polar modifiers causes styrene to polymerize much faster than isoprene. Hence, the initial portion of styrene-isoprene copolymers synthesized in the presence of such polar modifiers is mainly comprised of repeat units which are derived from styrene followed by a block of repeat units which are derived primarily from isoprene. Additionally, such copolymers have a low 1,4-polyisoprene microstructure content which results in the polymer providing poor tread wear characteristics when utilized in tire tread rubber compounds.

It has not been possible to prepare truly random copolymers of styrene and isoprene in batch polymerizations. Polar modifiers can be utilized to shift the relative rates of styrene and isoprene polymerization. However, standard polar modifiers do not cause styrene and isoprene to polymerize at the same rate. Such a modifier is required to prepare truly random styrene-isoprene copolymers by batch polymerization.

SUMMARY OF THE INVENTION

It has been unexpectedly found that 1,2-dipiperidinoethane, dipiperidinomethane, and tripiperidinophosphine oxide act as polar modifiers in copolymerizations of styrene and isoprene. The utilization of these compounds in organolithium initiated copolymerizations of styrene and isoprene results in the styrene and isoprene polymerizing at about the same rate. Thus, these modifiers can be utilized in batch polymerizations to prepare random styrene-isoprene rubbers. The utilization of these modifiers also result in the production of styrene-isoprene rubbers having a medium vinyl microstructure.

The subject invention more specifically discloses a process for preparing a random styrene-isoprene rubber having a medium vinyl microstructure which comprises copolymerizing isoprene and styrene in the presence of (a) at least one organolithium compound and (b) at least one modifier selected from the group consisting of 1,2-dipiperidinoethane, dipiperidinomethane, and tripiperidinophosphine oxide.

DETAILED DESCRIPTION OF THE INVENTION

By utilizing the technique of this invention, essentially random copolymers of styrene and isoprene can be synthesized. These styrene-isoprene rubbers typically contain from about 5 to about 40 weight percent styrene and from about 60 to about 95 weight percent isoprene. These styrene-isoprene rubbers preferably contain from about 10 to about 35 weight percent styrene and from about 65 to about 90 weight percent isoprene. It is most preferred for the styrene-isoprene copolymer to contain from about 15 to about 30 weight percent styrene and from about 70 to about 85 weight percent isoprene. The copolymers prepared in accordance with this invention have a medium vinyl microstructure. As a general rule, these medium vinyl styrene-isoprene rubbers have a vinyl content which is within the range of about 25 percent to about 50 percent. It is more typical for these medium vinyl styrene-isoprene copolymers to have a vinyl content which is within the range of about 30 percent to about 40 percent. In other words, it is very typical for such styrene-isoprene copolymers to have from about 30 percent to about 40 percent of their repeat units which are derived from isoprene being in the 3,4-microstructure and 1,2-microstructure.

The polymerizations of the present invention which are carried out in the presence of 1,2-dipiperidinoethane (DPE), dipiperidinomethane (DPM), and/or tripiperidinophosphine oxide (TPPO) will normally be carried out in a hydrocarbon solvent which can be one or more aromatic, paraffinic, or cycloparaffinic compounds. These solvents will normally contain from 4 to 10 carbon atoms per molecule and will be liquids under the conditions of the polymerization. Some representative examples of suitable organic solvents include pentane, isooctane, cyclohexane, normal hexane, benzene, toluene, xylene, ethylbenzene, and the like, alone or in admixture. The DPE, DPM and TPPO modifiers of this invention are also useful in bulk polymerizations which are initiated with lithium catalyst systems.

In solution polymerizations which utilize the modifiers of this invention, there will normally be from 5 to 35 weight percent monomers in the polymerization medium. Such polymerization mediums are, of course, comprised of an organic solvent, monomers, an organolithium initiator, and the modifier. In most cases it will be preferred for the polymerization medium to contain from 10 to 30 weight percent monomers. It is generally more preferred for the polymerization medium to contain 20 to 25 weight percent monomers.

The organolithium initiators employed in the process of this invention include the monofunctional and multifunctional types known for polymerizing the monomers described herein. The multifunctional organolithium initiators can be either specific organolithium compounds or can be multifunctional types which are not necessarily specific compounds but rather represent reproducible compositions of regulable functionality.

The amount of organolithium initiator utilized will vary with the monomers being polymerized and with the molecular weight that is desired for the polymer being synthesized. However, as a general rule from 0.01 to 1 phm (parts per 100 parts by weight of monomer) of an organolithium initiator will be utilized. In most cases, from 0.01 to 0.1 phm of an organolithium initiator will be utilized with it being preferred to utilize 0.025 to 0.07 phm of the organolithium initiator.

The choice of initiator can be governed by the degree of branching and the degree of elasticity desired for the polymer, the nature of the feedstock, and the like. With regard to the feedstock employed as the source of conjugated diene, for example, the multifunctional initiator types generally are preferred when a low concentration diene stream is at least a portion of the feedstock, since some components present in the unpurified low concentration diene stream may tend to react with carbon lithium bonds to deactivate initiator activity, thus necessitating the presence of sufficient lithium functionality in the initiator so as to override such effects.

The multifunctional initiators which can be used include those prepared by reacting an organomonolithium compounded with a multivinylphosphine or with a multivinylsilane, such a reaction preferably being conducted in an inert diluent such as a hydrocarbon or a mixture of a hydrocarbon and a polar organic compound. The reaction between the multivinylsilane or multivinylphosphine and the organomonolithium compound can result in a precipitate which can be solubilized if desired, by adding a solubilizing monomer such as a conjugated diene or monovinyl aromatic compound, after reaction of the primary components. Alternatively, the reaction can be conducted in the presence of a minor amount of the solubilizing monomer. The relative amounts of the organomonolithium compound and the multivinylsilane or the multivinylphosphine preferably should be in the range of about 0.33 to 4 moles of organomonolithium compound per mole of vinyl groups present in the multivinylsilane or multivinylphosphine employed. It should be noted that such multifunctional initiators are commonly used as mixtures of compounds rather than as specific individual compounds.

Exemplary organomonolithium compounds include ethyllithium, isopropyllithium, n-butyllithium, sec-butyllithium, tert-octyllithium, n-eicosyllithium, phenyllithium, 2-naphthyllithium, 4-butylphenyllithium, 4-tolyllithium, 4-phenylbutyllithium, cyclohexyllithium, and the like.

Exemplary multivinylsilane compounds include tetravinylsilane, methyltrivinylsilane, diethyldivinylsilane, di-n-dodecyldivinylsilane, cyclohexyltrivinylsilane, phenyltrivinylsilane, benzyltrivinylsilane, (3-ethylcyclohexyl) (3-n-butylphenyl)divinylsilane, and the like.

Exemplary multivinylphosphine compounds include trivinylphosphine, methyldivinylphosphine, dodecyldivinylphosphine, phenyldivinylphosphine, cyclooctyldivinylphosphine, and the like.

Other multifunctional polymerization initiators can be prepared by utilizing an organomonolithium compound, further together with a multivinylaromatic compound and either a conjugated diene or monovinylaromatic compound or both. These ingredients can be charged initially, usually in the presence of a hydrocarbon or a mixture of a hydrocarbon and a polar organic compound as diluent. Alternatively, a multifunctional polymerization initiator can be prepared in a two-step process by reacting the organomonolithium compound with a conjugated diene or monovinyl aromatic compound additive and then adding the multivinyl aromatic compound. Any of the conjugated dienes or monovinyl aromatic compounds described can be employed. The ratio of conjugated diene or monovinyl aromatic compound additive employed preferably should be in the range of about 2 to 15 moles of polymerizable compound per mole of organolithium compound. The amount of multivinylaromatic compound employed preferably should be in the range of about 0.05 to 2 moles per mole of organomonolithium compound.

Exemplary multivinyl aromatic compounds include 1,2-divinylbenzene, 1,3-divinylbenzene, 1,4-divinylbenzene, 1,2,4-trivinylbenzene, 1,3-divinylnaphthalene, 1,8-divinylnaphthalene, 1,3,5-trivinylnaphthalene, 2,4-divinylbiphenyl, 3,5,4'-trivinylbiphenyl, m-diisopropenyl benzene, p-diisopropenyl benzene, 1,3-divinyl-4,5,8-tributylnaphthalene, and the like. Divinyl aromatic hydrocarbons containing up to 18 carbon atoms per molecule are preferred, particularly divinylbenzene as either the ortho, meta, or para isomer, and commercial divinylbenzene, which is a mixture of the three isomers, and other compounds such as the ethylstyrenes, also is quite satisfactory.

Other types of multifunctional initiators can be employed such as those prepared by contacting a sec- or tert-organomonolithium compound with 1,3-butadiene, on a ratio of such as about 2 to 4 moles of organomonolithium compound per mole of 1,3-butadiene, in the absence of added polar material in this instance, with the contacting preferably being conducted in an inert hydrocarbon diluent, though contacting without the diluent can be employed if desired.

Alternatively, specific organolithium compounds can be employed as initiators, if desired, in the preparation of polymers in accordance with the present invention. These can be represented by $R(Li)_x$ wherein R represents a hydrocarbyl radical of such as 1 to 20 carbon atoms per R group, and x is an integer of 1 to 4. Exemplary organolithium com1pounds are methyllithium, isopropyllithium, n-butyllithium, sec-butyllithium, tert-octyllithium, n-decyllithium, phenyllithium, 1-naphthyllithium, 4-butylphenyllithium, p-tolyllithium, 4-phenylbutyllithium, cyclohexyllithium, 4-butylcyclohexyllithium, 4-cyclohexylbutyllithium, dilithiomethane, 1,4-dilithiobutane, 1,10-dilithiodecane, 1,20-dilithioeicosane, 1,4-dilithiocyclohexane, 1,4-dilithio-2-butane, 1,8-dilithio-3-decene, 1,2-dilithio-1,8-diphenyloctane, 1,4-dilithiobenzene, 1,4-dilithionaphthalene, 9,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, 4,4'-dilithiobiphenyl, and the like.

The modifiers which can be employed in the synthesis of the random styrene-isoprene rubbers of this invention having a medium vinyl microstructure include 1,2-dipiperidinoethane (DPE), dipiperidinomethane (DPM), and tripiperidinophosphine oxide (TPPO). TPPO is the preferred modifier. This is because polymerizations conducted in its presence proceed at a much faster rate. This allows for greater throughputs and higher levels of production in commercial operations. The utilization of TPPO as a modifier also results in the styrene-isoprene rubber having a higher 3,4-polyisoprene microstructure content than when DPE is utilized as the modifier.

The modifier being utilized can be introduced into the polymerization zone being utilized in any manner. In one embodiment, it can be reacted with an organolithium compound with the reaction mixture therefrom being introduced into the polymerization zone as the initiator. In another embodiment, the modifier can be introduced into the polymerization zone directly without first being reacted with the organolithium compound being utilized. In other words, the modifier can be introduced into the polymerization zone in the form of a reaction mixture with the organolithium catalyst or they can be introduced into the polymerization zone separately.

The amount of DPE, DPM, or TPPO modifier needed will vary greatly with the vinyl content and the degree of randomization which is desired for the styrene-isoprene rubber being synthesized. For instance, polymers with only slightly increased vinyl contents can be prepared by utilizing as little as 0.1 moles of the modifier per mole of lithium in the lithium catalyst being utilized. If polymers having very high vinyl contents are desired, then large quantities of the modifier can be used. However, normally there will be no reason to employ more than about 20 moles of the DPE, DPM, or TPPO modifier per mole of lithium in the lithium catalyst system employed. In most cases from about 0.2 to about 10 moles of the modifier will be employed per mole of lithium in the lithium catalyst system utilized. Preferably from about 0.5 to 5 moles of the modifier will be utilized per mole of lithium with from about 1 to 2 moles of the modifier per mole of lithium being most preferred.

The polymerization temperature utilized can vary over a broad range of from about −20° C. to about 100° C. The use of temperatures of less than −20° C. results in a very slow rate of polymerization. The use of temperatures in excess of about 100° C. results in the modifier being rendered ineffective. In most cases a temperature within the range of about 20° C. to about 80° C. will be utilized with temperatures within the range of 40° C. to 65° C. being more preferred. The pressure used will normally be sufficient to maintain a substantially liquid phase under the conditions of the polymerization reaction.

The polymerization is conducted for a length of time sufficient to permit substantially complete polymerization of monomers. In other words, the polymerization is normally carried out until high conversions are attained. The polymerization can then be terminated using a standard technique. The polymerization can be terminated with a conventional noncoupling type of terminator, such as water, an acid, a lower alcohol, and the like or with a coupling agent.

Coupling agents can be used in order to improve the cold flow characteristics of the rubber and rolling resistance of tires made therefrom. It also leads to better processability and other beneficial properties. A wide variety of compounds suitable for such purposes can be employed. Some representative examples of suitable coupling agents include: multivinylaromatic compounds, multiepoxides, multiisocyanates, multiimines, multialdehydes, multiketones, multihalides, multianhydrides, multiesters which are the esters of polyalcohols with monocarboxylic acids, and the diesters which are esters of monohydric alcohols with dicarboxylic acids, and the like.

Examples of suitable multivinylaromatic compounds include divinylbenzene, 1,2,4-trivinylbenzene, 1,3-divinylnaphthalene, 1,8-divinylnaphthalene, 1,3,5-trivinylnaphthalene, 2,4-divinylbiphenyl, and the like. The divinylaromatic hydrocarbons are preferred, particularly divinylbenzene in either its ortho, meta, or para isomer. Commercial divinylbenzene which is a mixture of the three isomers and other compounds is quite satisfactory.

While any multiepoxide can be used, we prefer those which are liquid since they are more readily handled and form a relatively small nucleus for the radial polymer. Especially preferred among the multiepoxides are the epoxidized hydrocarbon polymers such as epoxidized liquid polybutadienes and the epoxidized vegetable oils such as epoxidized soybean oil and epoxidized linseed oil. Other epoxy compounds such as 1,2,5,6,9,10-triepoxydecane, and the like, also can be used.

Examples of suitable multiisocyanates include benzene-1,2,4-triisocyanate, naphthalene-1,2,5,7-tetraisocyanate, and the like. Especially suitable is a commercially available product known as PAPI-1, a polyarylpolyisocyanate having an average of 3 isocyanate groups per molecule and an average molecular weight of about 380. Such a compound can be visualized as a series of isocyanate-substituted benzene rings joined through methylene linkages.

The multiimines, which are also known as multiaziridinyl compounds, preferably are those containing 3 or more aziridine rings per molecule. Examples of such compounds include the triaziridinyl phosphine oxides or sulfides such as tri(1-ariridinyl)phosphine oxide, tri(2-methyl-1-ariridinyl)phosphine oxide, tri(2-ethyl-3-decyl-1-ariridinyl)phosphine sulfide, and the like.

The multialdehydes are represented by compounds such as 1,4,7-naphthalene tricarboxyaldehyde, 1,7,9-anthracene tricarboxyaldehyde, 1,1,5-pentane tricarboxyaldehyde, and similar multialdehyde containing aliphatic and aromatic compounds. The multiketones can be represented by compounds such as 1,4,9,10-anthraceneterone, 2,3-diacetonylcyclohexanone, and the like. Examples of the multianhydrides include pyromellitic dianhydride, styrene-maleic anhydride copolymers, and the like. Examples of the multiesters include diethyladipate, triethylcitrate, 1,3,5-tricarbethoxybenzene, and the like.

The preferred multihalides are silicon tetrahalides, such as silicon tetrachloride, silicon tetrabromide, and silicon tetraiodide, and the trihalosilanes such as trifluorosilane, trichlorosilane, trichloroethylsilane, tribromobenzylsilane, and the like. Also preferred are the multihalogen-substituted hydrocarbons, such as 1,3,5-tri(bromomethyl)benzene, 2,4,6,9-tetrachloro-3,7-decadiene, and the like, in which the halogen is attached to a carbon atom which is alpha to an activating group such as an ether linkage, a carbonyl group, or a carbon-to-carbon double bond. Substituents inert with respect to lithium atoms in the terminally reactive polymer can also be present in the active halogen-containing compounds. Alternatively, other suitable reactive groups different from the halogen as described above can be present.

Examples of compounds containing more than one type of functional group include 1,3-dichloro-2-propanone, 2,2-dibromo-3-decanone, 3,5,5-trifluoro-4-octanone, 2,4-dibromo-3-pentanone, 1,2,4,5-diepoxy-3-pentanone, 1,2,4,5-diepoxy-3-hexanone, 1,2,11,12-diepoxy-8-pentadecanone, 1,3,18,19-diepoxy-7,14-eicosanedione, and the like.

In addition to the silicon multihalides as described hereinabove, other metal multihalides, particularly those of tin, lead, or germanium, also can be readily employed as coupling and branching agents. Difunctional counterparts of these agents also can be employed, whereby a linear polymer rather than a branched polymer results.

Broadly, and exemplarily, a range of about 0.01 to 4.5 milliequivalents of coupling agent are employed per 100 grams of monomer. It is preferred to utilize about 0.01 to about 1.5 milliequivalents of the coupling agent per 100 grams of monomer to obtain the desired Mooney viscosity. The larger quantities tend to result in production of polymers containing terminally reactive groups or insufficient coupling. One equivalent of treating agent per equivalent of lithium is considered optimum amount for maximum branching, if this result is desired in the production line. The coupling agent can be added in hydrocarbon solution, e.g., in cyclohexane, to the polymerization admixture in the final reactor with suitable mixing for distribution and reaction.

Polymers which are made by utilizing the modifiers of this invention in solution polymerizations can be recovered utilizing conventional techniques. In many cases it will be desirable to destroy residual carbon-lithium bonds which may be present in the polymer solution and to recover the synthetic polymer produced. It may also be desirable to add additional antioxidants to the polymer solution in order to further protect the rubber produced from potentially deleterious effects of contact with oxygen. The styrene-isoprene elastomer made can be precipitated from the polymer solution and any remaining lithium moieties can be inactivated by the addition of lower alcohols, such as isopropyl alcohol, to the polymer solution. The styrene-isoprene elastomer can be recovered from the solvent and residue by means such as decantation, filtration, centrification, and the like. Steam stripping can also be utilized in order to remove volatile organic compounds.

This invention is illustrated by the following examples which are merely for the purpose of illustration and are not to be regarded as limiting the scope of the invention or the manner in which it can be practiced. Unless specifically indicated otherwise, parts and percentages are given by weight.

EXAMPLES 1–5

A series of experiments were run to evaluate DPE as a catalyst modifier. A predried 17.8% premix monomer solution in hexane was prepared. This premixed monomer solution contained 20% styrene and 80% isoprene. The monomer premix solution was then charged into a one-gallon (3.8 liter) reactor.

Scavenger level tests were run on the premix solution using conventional techniques and the scavenger level was determined. The molar ratio of modifier to lithium was 2. After scavenging the premix, 0.79 ml of neat DPE and 1.77 ml of a 1.04 M n-butyl lithium in hexane solution were added to the reactor successively at 50° C. The target number average molecular weight for this level of initiator was calculated to be 300,000.

Small quantities of reaction mixture were taken from the reactor and analyzed for residual monomers to determine the rate of isoprene and styrene polymerization. The conversion of styrene monomer, conversion of isoprene monomer and total conversion at various points during the polymerization is shown in Table I.

TABLE I

| Time (minutes) | Styrene Conversion | Isoprene Conversion | Total Conversion |
|---|---|---|---|
| 15 | 10% | 19% | 17% |
| 30 | 20% | 33% | 31% |
| 45 | 30% | 45% | 43% |
| 60 | 40% | 55% | 53% |
| 75 | 47% | 62% | 59% |
| 90 | 53% | 68% | 66% |
| 120 | 62% | 77% | 75% |
| 150 | 71% | 83% | 81% |
| 180 | 78% | 88% | 86% |
| 210 | 83% | 92% | 90% |
| 240 | 86% | 94% | 92% |
| 300 | 91% | 96% | 95% |
| 360 | 98% | 95% | 97% |

After the polymerization was completed, 1 ml of neat methanol was added to the reactor. This was followed by adding 1 phr of an antidegradant to the polymer cement. After evaporating the hexane solvent, the styrene-isoprene rubber was dried in a vacuum oven overnight at 50° C. The styrene-butadiene rubber recovered was determined to have a glass transition temperature of −28° C. It was also determined to have a Mooney ML-4 viscosity of 46.

Styrene-isoprene rubbers having different styrene to isoprene ratios were prepared utilizing the same procedure. In these polymerizations the styrene and isoprene also showed similar rates of polymerization. The microstructures of the styrene-isoprene rubbers prepared in this series of experiments are shown in Table II.

TABLE II

| Example | Target Ratio Styrene: Isoprene | Microstructure (%) | | | |
|---|---|---|---|---|---|
| | | Styrene | 1,4-PI | 3,4-PI | 1,2-PI |
| 1 | 20:80 | 19 | 54 | 25 | 2 |
| 2 | 10:90 | 10 | 60 | 27 | 3 |
| 3 | 15:85 | 13 | 61 | 23 | 3 |
| 4 | 25:75 | 23 | 56 | 21 | 0 |
| 5 | 30:60 | 29 | 51 | 18 | 2 |

PI = polyisoprene units

As can be seen by reviewing Table II, the styrene-isoprene rubbers made in the presence of DPE had vinyl microstructures. From about 27% to about 33% of the repeat units in the rubber which were derived from polyisoprene were 3,4-polyisoprene units or 1,2-polyisoprene units (vinyl units). Thus, this experiment shows that DPE can be utilized as a modifier for preparing essentially random copolymers of styrene and isoprene having a medium vinyl microstructure.

EXAMPLE 6

In this experiment a predried 17.8% solution of styrene and isoprene in hexane was prepared. It contained 35% styrene and 65% isoprene. 2,730 grams of the styrene/isoprene premix monomer solution was charged into a 1 gallon (3.8 liter) reactor. After scavenging the premix solution, 1.1 ml of a 0.59 M TPPO in hexane solution and 1.58 ml of a 1.04 M n-butyl lithium in hexane solution were added successively to the reactor which was maintained at 50° C. The amount of n-butyl lithium utilized was calculated to result in the production of a styrene-isoprene rubber having a number average molecular weight of 300,000.

Small quantities of the reaction mixture were taken from the reactor as the polymerization proceeded and analyzed for residual monomers to determine the rate of isoprene and styrene polymerization. The conversion of styrene and isoprene as the polymerization proceeded is reported in Table III.

TABLE III

| Time (minutes) | Styrene Conversion | Isoprene Conversion |
| --- | --- | --- |
| 5 | 24% | 28% |
| 10 | 52% | 52% |
| 15 | 68% | 67% |
| 20 | 82% | 79% |
| 25 | 87% | 85% |
| 30 | 92% | 89% |
| 40 | 95% | 93% |
| 50 | 97% | 96% |
| 60 | 100% | 97% |
| 90 | 100% | 99% |
| 105 | 100% | 100% |

As can be seen from examining Table III, the styrene and isoprene polymerized at virtually the same rate. This shows that TPPO can be utilized as a modifier to produce essentially random copolymers of styrene and isoprene by batch polymerization. After the polymerization was completed, 1 ml of neat methanol was added to the reactor. Then 1 phr (parts per hundred parts of rubber) of an antidegradant was added to the rubber cement. The hexane solvent was evaporated and the styrene-isoprene rubber was dried in vacuum overnight at 50° C. The styrene-isoprene copolymer recovered was determined to have a glass transition temperature of −7.5° C. It was also determined to have a Mooney ML-4 viscosity of 69. It was further determined to contain 33% styrene, 42% 1,4-polyisoprene units, 23% 3,4-polyisoprene units and 2% 1,2-polyisoprene units.

This example shows that TPPO is an excellent choice as a modifier. The polymerization conducted in its presence proceeded at a much faster rate than do polymerizations which are conducted in the presence of DPE. The TPPO also caused the styrene and isoprene monomer to polymerize at virtually identical rates.

While certain representative embodiments and details have been shown for the purpose of illustrating the present invention, it will be apparent to those skilled in this art that various changes and modifications can be made without departing from the scope of the present invention.

What is claimed is:

1. A process for preparing a random rubbery binary copolymer of styrene and isoprene having a medium vinyl microstructure which consists of (1) copolymerizing isoprene and styrene by solution polymerization in an organic solvent in the present of at least one organomonolithium compound and (b) dipiperidinomethane and (2) recovering the random rubbery binary copolymer of styrene and isoprene from the organic solvent.

2. A process as specified in claim 1 wherein said copolymerization is carried out at a temperature which is within the range of about 31 20° C. to about 100° C.

3. A process as specified in claim 2 wherein the molar ratio of the modifier to the organolithium compound is within the range of about 0.1:1 to about 20:1.

4. A process as specified in claim 3 wherein styrene represents from about 5 percent to about 40 percent by weight of the total monomers.

5. A process as specified in claim 3 wherein the organomonolithium compound is selected from the group consisting of ethyllithium, isopropyllithium, n-butyllithium, secondary-butyllithium, tert-octyllithium, n-eicosyllithium, phenyllithium, 2-naphthyllithium, 4-butylphenyllithium, 4-tolyllithium, 4-phenylbutyllithium, and cyclohexyllithium.

6. A process as specified in claim 3 wherein the organic solvent contains from 4 to 10 carbon atoms per molecule.

7. A process as specified in claim 1 wherein said copolymerization is conducted at a temperature which is within the range of about 20° C. to about 80° C.

8. A process as specified in claim 7 wherein the molar ratio of the modifier to the organolithium compound is within the range of about 0.2:1 to about 10:1.

9. A process as specified in claim 8 wherein styrene represents from about 10% to about 35% by weight of the total monomers.

10. A process as specified in claim 9 wherein the organic solvent is a paraffinic compound or a cycloparaffinic compound.

11. A process as specified in claim 10 wherein the molar ratio of the modifier to the organo lithium compound is within the range of about 0.5:1 to about 5:1.

12. A process as specified in claim 10 wherein the molar ratio of the modifier to the organolithium compound is within the range of about 1:1 to about 2:1.

13. A process as specified in claim 11 wherein said copolymerization is conducted at a temperature which is within the range of about 40° C. to about 65° C.

14. A process as specified in claim 11 wherein said organolithium compound is n-butyl lithium.

15. A process as specified in claim 11 wherein the organic solvent is selected from the group consisting of hexane and cyclohexane.

16. A process as specified in claim 1 wherein the random rubbery binary copolymer of styrene and isoprene is recovered from the organic solvent by a means selected from the group consisting of decantation, filtration, and centrification.

* * * * *